United States Patent
Patil et al.

(10) Patent No.: US 10,956,174 B1
(45) Date of Patent: Mar. 23, 2021

(54) LAZY BARE METAL RESTORE

(71) Applicant: Veritas Technologies LLC, Mountain View, CA (US)

(72) Inventors: Dhanashri Parasharam Patil, Kolhapur (IN); Narendra Katlamudi, West Godavari (IN); Anay Shrikant Kulkarni, Pune (IN); Amar Mhetre, Pune (IN)

(73) Assignee: Veritas Technologies LLC, Santa Clara, CA (US)

( * ) Notice: Subject to any disclaimer, the term of this patent is extended or adjusted under 35 U.S.C. 154(b) by 256 days.

(21) Appl. No.: 14/874,669

(22) Filed: Oct. 5, 2015

(51) Int. Cl.
*G06F 9/4401* (2018.01)
*G06F 11/14* (2006.01)

(52) U.S. Cl.
CPC .......... *G06F 9/441* (2013.01); *G06F 11/1469* (2013.01); *G06F 11/1471* (2013.01)

(58) Field of Classification Search
None
See application file for complete search history.

(56) References Cited

U.S. PATENT DOCUMENTS

| | | | | |
|---|---|---|---|---|
| 6,145,088 A * | 11/2000 | Stevens | ............... | G06F 11/0709 714/2 |
| 6,374,353 B1 * | 4/2002 | Settsu | ................... | G06F 9/4406 713/2 |
| 6,505,216 B1 * | 1/2003 | Schutzman | ......... | G06F 11/1456 |
| 6,684,306 B1 * | 1/2004 | Nagasawa | ........... | G06F 11/1458 711/154 |
| 6,854,009 B1 * | 2/2005 | Hughes | ................. | G06F 9/4406 709/219 |
| 7,293,272 B1 | 11/2007 | Okcu et al. | | |
| 7,313,719 B1 | 12/2007 | Elahee | | |
| 7,330,967 B1 | 2/2008 | Pujare et al. | | |
| 7,334,157 B1 | 2/2008 | Graf et al. | | |
| 7,565,517 B1 | 7/2009 | Arbon | | |
| 7,769,990 B1 | 8/2010 | Okcu et al. | | |
| 7,886,185 B1 | 2/2011 | Okcu et al. | | |
| 8,103,747 B2 | 1/2012 | Trujillo | | |
| 8,132,186 B1 | 3/2012 | Okcu et al. | | |
| 9,146,748 B1 | 9/2015 | Kumar | | |
| 2004/0107359 A1 * | 6/2004 | Kawano | ................. | G06F 9/441 726/26 |

(Continued)

OTHER PUBLICATIONS

Okcu, Okan, U.S. Appl. No. 11/351,778, entitled "Detecting and Performing Dissimilar System Restore", filed Feb. 10, 2006, 35 pages.

*Primary Examiner* — Paul Yen
(74) *Attorney, Agent, or Firm* — Kowert Hood Munyon Rankin and Goetzel PC; Rory D. Rankin

(57) ABSTRACT

Systems, apparatuses, methods, and computer readable mediums for performing a lazy bare metal restore process. A system may boot into a mini-OS environment and recover only the OS volumes while running in the mini-OS environment. Then, the system may boot into the target OS in restricted mode, using the recovered OS volumes, wherein restricted mode is utilized so as to prevent any applications from running. While the system is running the target OS in restricted mode, the system may restore the remainder of the backup data. Then, once all of the data has been recovered, the system may boot into the target OS in normal mode.

20 Claims, 7 Drawing Sheets

(56) References Cited

U.S. PATENT DOCUMENTS

| 2007/0180535 | A1* | 8/2007 | Seo | G06F 21/6281 |
| | | | | 726/27 |
| 2008/0126444 | A1* | 5/2008 | van Ingen | G06F 11/1469 |
| 2008/0270782 | A1* | 10/2008 | Bone | H04L 67/14 |
| | | | | 713/2 |
| 2013/0326260 | A1* | 12/2013 | Wei | G06F 11/20 |
| | | | | 714/3 |

* cited by examiner

LAZY BARE METAL RESTORE

BACKGROUND

Technical Field

Embodiments described herein relate to computer systems and more particularly, to performing restore operations.

Description of the Related Art

With the increasing importance and reliance on the data used to run and manage various business applications, data and system software is typically backed up to a backup recovery system. In cases where an operating system (OS) has crashed, is malfunctioning, or is otherwise unavailable, a bare metal restore mechanism may be needed. For bare metal restore solutions, Microsoft® Windows® Preinstallation Environment (WinPE) is often used as the base environment for recovery. The limitations of using WinPE, such as its incompatibility with different versions of volume manager software and different file systems, complicates bare metal restore operations.

SUMMARY

Systems, apparatuses, and methods for performing lazy bare metal restore operations are disclosed.

In various embodiments, a client computing system may initiate a bare metal restore recovery. In one embodiment, a bare metal restore recovery may begin by booting the system using a mini-OS. In one embodiment, the mini-OS may be the WinPE operating system. In another embodiment, the mini-OS environment may utilize a Linux® mini-OS. In the mini-OS environment, the system may recover only the OS volumes for booting the target OS of the system. Only the data needed to recover the OS may be recovered in the mini-OS environment.

Then, after the OS volumes have been recovered, the system may boot into the target OS in restricted mode. In one embodiment, booting the target OS in restricted mode may comprise booting the target OS in safe mode. Booting the target OS in restricted mode may ensure that no extra applications are launched with the target OS. Once the system has been booted in the target OS in restricted mode, the system may recover the rest of the data from the backup image. Once all of the data has been recovered to the system, the system may boot into the target OS in normal mode.

These and other features and advantages will become apparent to those of ordinary skill in the art in view of the following detailed descriptions of the approaches presented herein.

BRIEF DESCRIPTION OF THE DRAWINGS

The above and further advantages of the methods and mechanisms may be better understood by referring to the following description in conjunction with the accompanying drawings, in which.

DETAILED DESCRIPTION OF EMBODIMENTS

Figure 1:
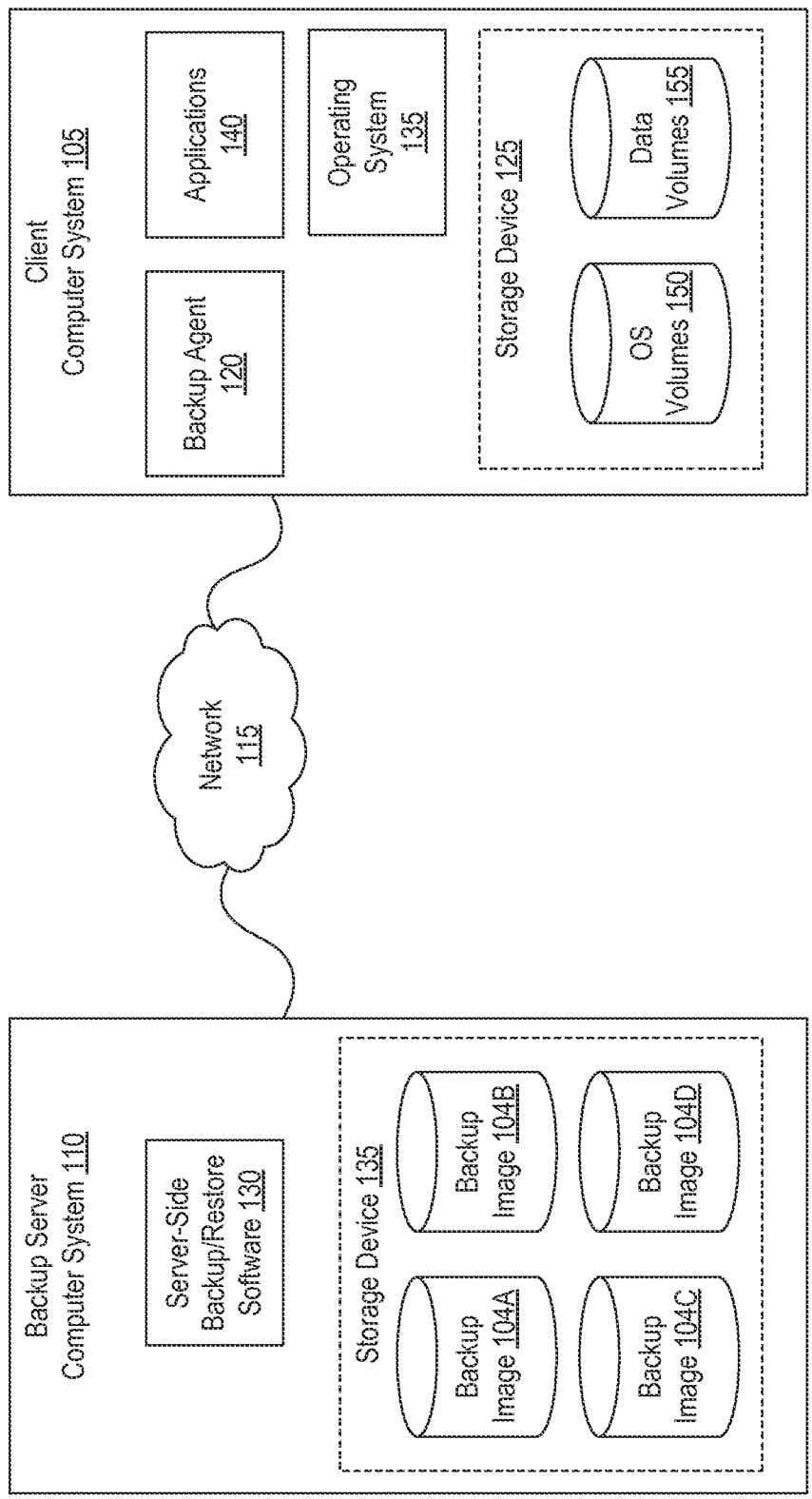
FIG. 1 is a block diagram of one embodiment of a system for performing a backup operation.

In the following description, numerous specific details are set forth to provide a thorough understanding of the methods and mechanisms presented herein. However, one having ordinary skill in the art should recognize that the various embodiments may be practiced without these specific details. In some instances, well-known structures, components, signals, computer program instructions, and techniques have not been shown in detail to avoid obscuring the approaches described herein. It will be appreciated that for simplicity and clarity of illustration, elements shown in the figures have not necessarily been drawn to scale. For example, the dimensions of some of the elements may be exaggerated relative to other elements.

This specification includes references to "one embodiment". The appearance of the phrase "in one embodiment" in different contexts does not necessarily refer to the same embodiment. Particular features, structures, or characteristics may be combined in any suitable manner consistent with this disclosure. Furthermore, as used throughout this application, the word "may" is used in a permissive sense (i.e., meaning having the potential to), rather than the mandatory sense (i.e., meaning must). Similarly, the words "include", "including", and "includes" mean including, but not limited to.

Terminology

The following paragraphs provide definitions and/or context for terms found in this disclosure (including the appended claims):

"Comprising." This term is open-ended. As used in the appended claims, this term does not foreclose additional structure or steps. Consider a claim that recites: "A system comprising a computing device . . . ." Such a claim does not foreclose the system from including additional components (e.g., a display unit, a storage unit).

"Configured To." Various units, circuits, or other components may be described or claimed as "configured to" perform a task or tasks. In such contexts, "configured to" is used to connote structure by indicating that the units/circuits/components include structure (e.g., circuitry) that performs the task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. § 112(f) for that unit/circuit/component. Additionally, "configured to" can include generic structure (e.g., generic circuitry) that is manipulated by software and/or firmware (e.g., an FPGA or a general-purpose processor executing software) to operate in a manner that is capable of performing the task(s) at issue.

"Configured to" may also include adapting a manufacturing process (e.g., a semiconductor fabrication facility) to fabricate devices (e.g., integrated circuits) that are adapted to implement or perform one or more tasks.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While B may be a factor that affects the determination of A, such a phrase does not foreclose the determination of A from also being based on C. In other instances, A may be determined based solely on B.

Referring now to FIG. 1, a block diagram of one embodiment of a system for performing a backup operation is shown. In the illustrated embodiment, the system includes a client computer system 105 and a backup server computer system 110. The client computer system 105 may be coupled to the backup server computer system 110 via a network 115. The network 115 may include any type of network or combination of networks. For example, the network 115 may include any type or combination of local area network (LAN), a wide area network (WAN), wireless networks, an Intranet, the Internet, etc. Examples of local area networks include Ethernet networks, Fiber Distributed Data Interface (FDDI) networks, and token ring networks. The computer systems may each be coupled to the network(s) using any type of wired or wireless connection medium. For example, wired mediums may include Ethernet, fiber channel, a modem connected to plain old telephone service (POTS), etc. Wireless connection mediums may include a wireless connection using a wireless communication protocol such as IEEE 802.11, a modem link through a cellular service, a satellite link, etc.

The client computer system 105 may include one or more storage devices 125. In various embodiments, the client computer system 105 may execute a variety of applications to provide various types of services to other computing devices and systems. For example, the client computer system 105 may execute front-end applications for internet web servers, back-end applications in support of various front-end applications, file backup and recovery applications, voice communications applications, video communications applications, email applications, instant messaging applications, database server applications, data processing applications, or other applications, or combinations thereof.

The client computer system 105 may also execute backup agent 120 that communicates over the network 115 with server-side backup/restore software 130 executing on the backup server computer system 110. The backup agent 120 and the server-side backup/restore software 130 may be configured to communicate to periodically backup the volumes 150 and 155 to the backup server computer system 110. Each time OS volumes 150 and data volumes 155 are modified, data from the volumes may be stored on a storage device 135 at the backup server computer system 110 in a respective backup image 104 that reflects the state of client computer system 105 at the time the backup operation is performed. As used herein, the term "backup image" refers to a data set created from a data source, where the data set includes a copy of at least some of the data in the data source.

In one embodiment, a given backup image 104 may include the system layout (or system blueprint) which forms the bare-metal information that is needed for performing bare metal restores. The given backup image 104 may be created and stored on any of various types of backup media (e.g., disk, storage area network (SAN) logical unit numbers (LUN), tapes) attached to the backup server computer system 110. In some embodiments, there may not be a separate backup server, and the given backup image 104 may be created and stored on a persistent storage device (e.g., pen drive, USB drive).

The backup images 104A-D created on the backup server computer system 110 may be either full backup images or incremental backup images of the data of client computer system 105. A full backup image may include a complete copy of the operating system, software applications, and data as they existed at the time the full backup image is created. For example, a full backup image may include all of the data of all of the files of client computer system 105. Thus, a full backup image may be an independent backup image that does not depend on any other backup image. An incremental backup image is a backup image that depends on, or is relative to, another backup image (e.g., an incremental backup image that represents the volume data that has changed since a previous backup image was created). An incremental backup image may depend on a full backup image (e.g., may represent the data changes that have occurred since the full backup image was created) or may depend on a previous incremental backup image (e.g., may represent the data changes that have occurred since the previous incremental backup image was created). An incremental backup image may include the data that has changed since the time when the (full or incremental) backup image on which it depends was created, and may not include data that has not changed since the time when the backup image on which it depends was created.

In the example of FIG. 1, four backup images 104A-104D have been created from client computer system 105 and stored on the backup server computer system 110. In various embodiments, any number of backup images 104 may be stored on the backup server computer system 110. For example, the backup software may be configured with a backup policy specifying that backup images should be periodically created from client computer system 105 and stored on the backup server computer system 110. As one example, the backup policy may specify that a full backup image should be created once a week, with incremental backup images being created at the end of each day, or another desired time schedule.

In other embodiments, instead of creating the backup images 104 periodically, client computer system 105 may be continuously backed up to a backup image 104 on the backup server computer system 110, e.g., according to a continuous data protection (CDP) model. For example, each time client computer system 105 receives a new write request directed to existing data, client-side backup/restore software (e.g., backup agent 120) may transmit the specified data to the backup server computer system 110 where it is used to update the backup image 104 in real time to reflect the new data. At a subsequent time after the backup images 104 have been created on the backup server computer system 110, the data may need to be restored from one of the backup images 104. For example, the storage device 125 at the client computer system 105 could fail and cause data to be lost, or the data or software at client computer system 105 could become corrupted so that one or more applications of client computer system 105 are no longer useable. In other scenarios, a bare metal restore operation may be necessary. For example, the OS may be corrupted, disk or hardware of the hosting OS may be corrupted or lost, a server may be migrating to new hardware, etc.

In various embodiments, the client computer system 105 and the backup server computer system 110 may each be any kind of computer system, such as a personal computer system (PC), workstation, network appliance, distributed computer system, handheld device, server, or other computing device or combinations of devices. In general, the terms "computer system" and "computing system" can be defined to encompass any device (or combination of devices) having at least one processor that executes instructions from one or more storage mediums.

Figure 2:
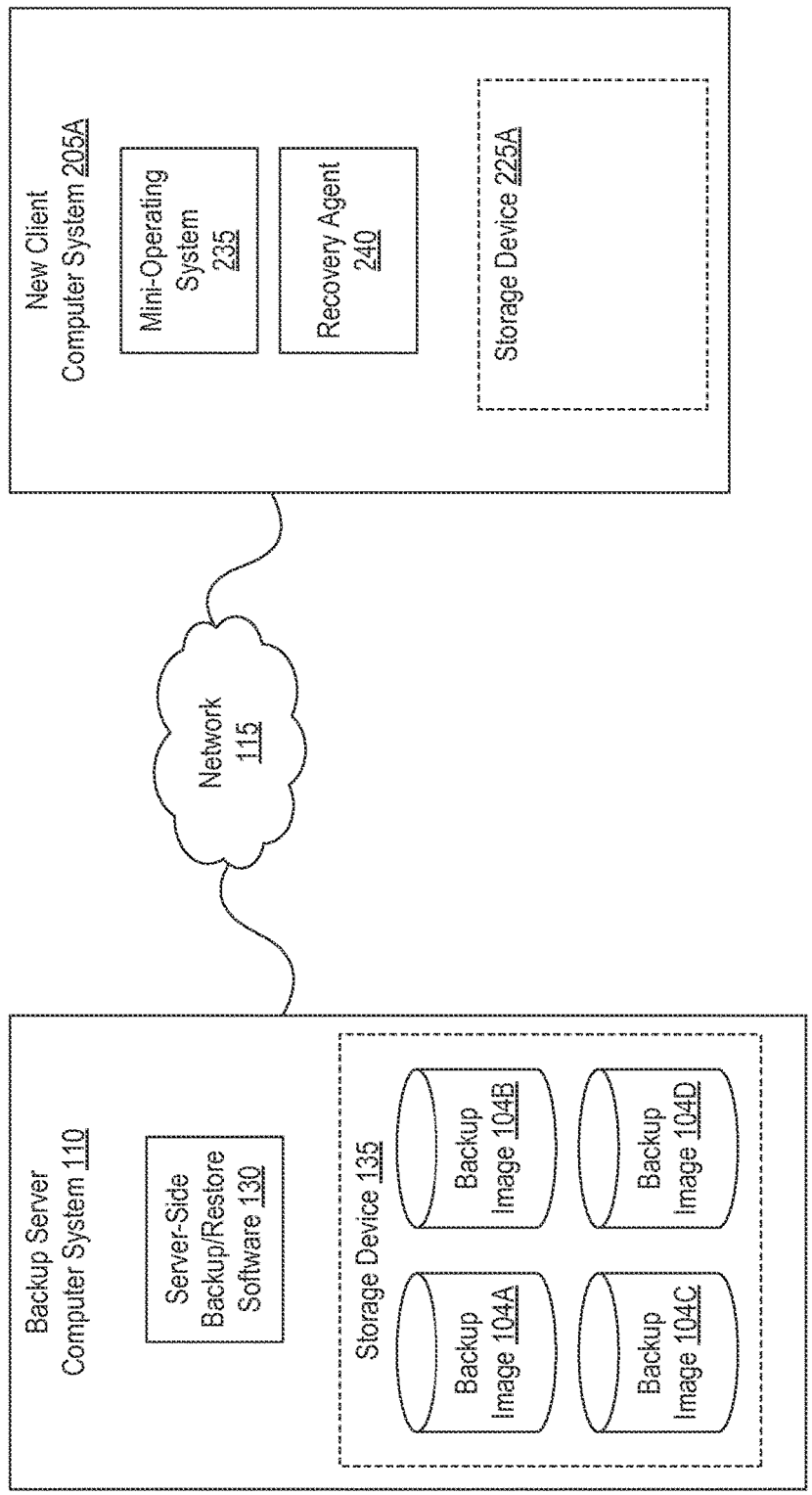
FIG. 2 is a block diagram of one embodiment of a system for performing a lazy bare metal restore.

Turning now to FIG. 2, a block diagram of one embodiment of a system 200 for performing a lazy bare metal restore is shown. New client computer system 205A may be a bare metal computer system, with the exception of the temporary mini-operating system (OS) 235 and recovery agent 240. A bare metal computer system may be defined as a computer system without an installed operating system or file system. Mini-OS 235 and recovery agent 240 may be accessible to new client computer system 205A via one or more removable media (e.g., disk, flash drive) and/or stored in volatile memory on new client computer system 205A. Alternatively, new client computer system 205A may be booted over a network where a bootable image is shared via the network. It may be assumed for the purposes of this discussion that a user desires to restore new client computer system 205A to a given backup image stored on backup server computer system 110. For example, in one embodiment, client computer system 105 (of FIG. 1) may have failed, and the user may wish to use new client computer system 205A to recreate the operating environment of client computer system 105 before it failed. New client computer system 205A represents any type or form of computing device or system.

Accordingly, new client computer system 205A may be booted with mini-OS 235. When a computer is powered on, the computer undergoes an initial set of operations to configure the hardware and software of the computer. This process is generally known as the boot process. In one embodiment, mini-OS 235 may be the Windows Preinstallation Environment (WinPE) OS. In other embodiments, other types of mini OS's may be used. Generally speaking, a mini OS (or temporary OS) may be defined as an OS with minimal functionality for recovering backup data. Mini-OS 235 may be a random-access memory (RAM)-based OS, wherein mini-OS 235 runs entirely from the RAM of new client computer system 205A. New client computer system 205A may boot into mini-OS 235, which may execute recovery agent 240 so as to retrieve the OS volumes from a selected backup image. New client computer system 205A may prevent other data (e.g., application data) from being retrieved during this phase of the bare metal restore process. Once the essential OS volumes are retrieved to storage device 225A which is representative of any number and type of storage devices, new client computer system 205A may transition into the next phase of the bare metal restore process, which will be described in further detail during the discussion associated with FIG. 3.

Figure 3:
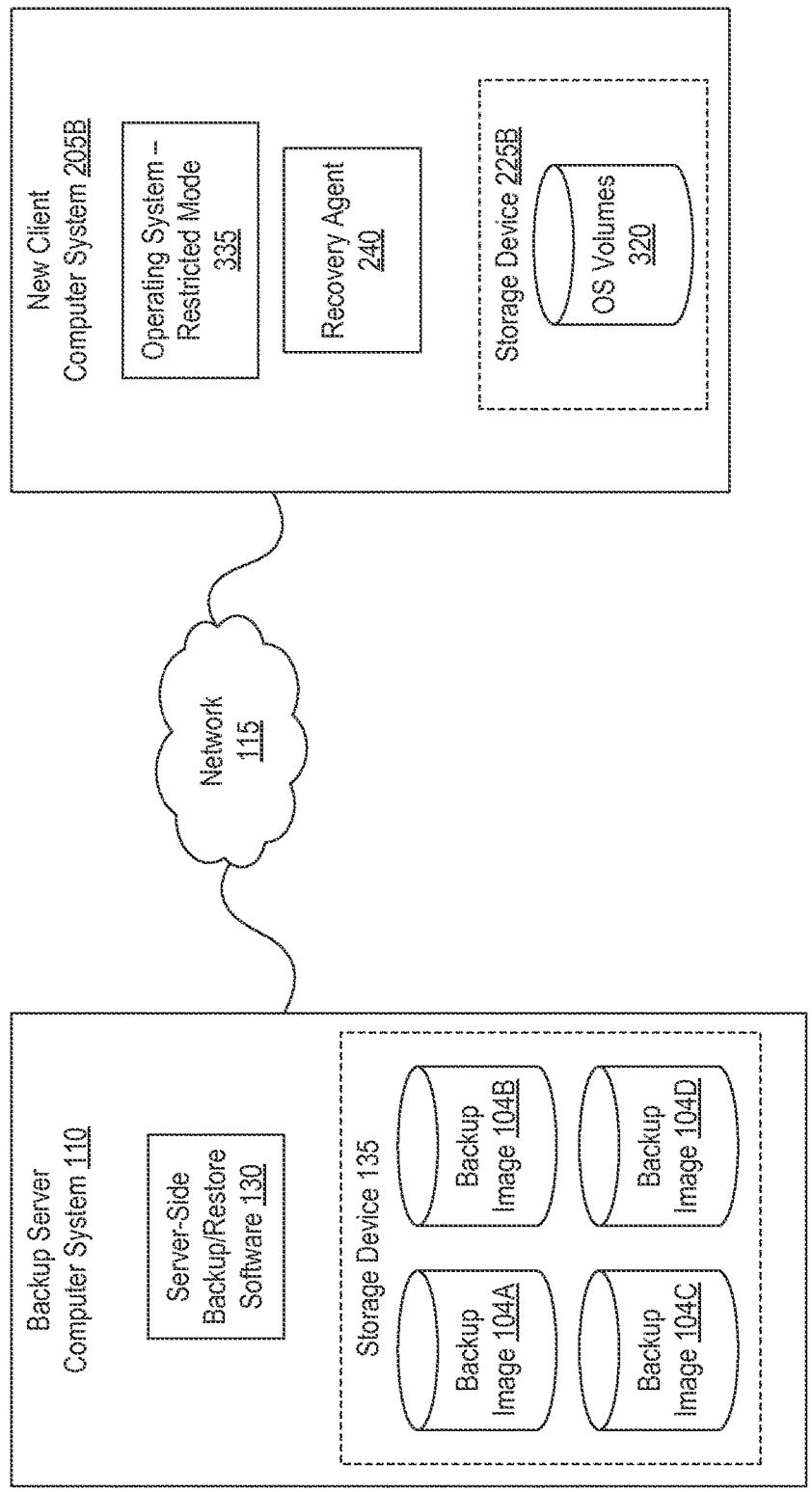
FIG. 3 is a block diagram of another embodiment of a system for performing a lazy bare metal restore.

Referring now to FIG. 3, another embodiment of a system 300 for performing a lazy bare metal restore is shown. System 300 is intended to represent system 200 at a later point in time in the lazy bare metal restore process. At the point in time represented by system 300, the OS volumes 320 have been retrieved from the selected backup image on backup server computer system 110 and stored on storage device 225B of new client computer system 205B. New client computer system 205B and storage device 225B are intended to represent new client computer system 205A and storage device 225A (of FIG. 2) in a subsequent phase of the lazy bare metal restore process.

Once the OS volumes 320 have been retrieved and stored on storage device 225B, new client computer system 205B may boot into the restricted mode of OS 335. In one embodiment, OS 335 may be a Windows OS, and the restricted mode may be safe mode or safe mode with networking. In another embodiment, OS 335 may be a Linux OS, and the restricted mode may be run level one or single user mode. The restricted mode of OS 335 may be utilized to prevent applications (e.g., volume manager) and other services from starting on boot up. In one embodiment, this booting into restricted mode does not require the user to manually turn off applications and services, allowing for an automatic bootup without user intervention. In another embodiment, logging into the restricted mode of OS 335 to perform the second part of the recovery may need additional user intervention. Once new client computer system 205B has booted into the restricted mode of OS 335, recovery agent 240 may retrieve the data volumes, application data, and other data of the selected backup image from backup server computer system 110.

Figure 4:
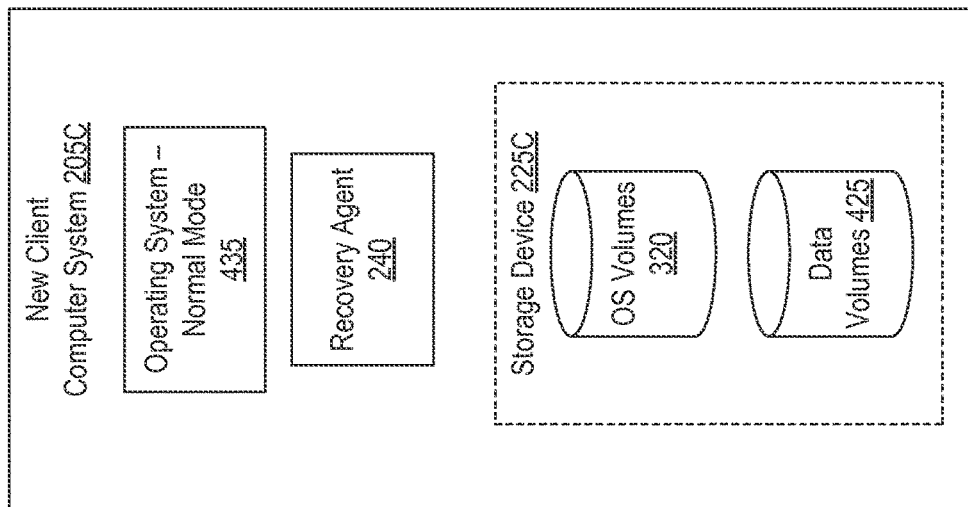
FIG. 4 is a block diagram of another embodiment of a system for performing a lazy bare metal restore.

Turning now to FIG. 4, another embodiment of a system 400 for performing a lazy bare metal restore is shown. System 400 is intended to represent system 300 (of FIG. 3) at a later point in time in the lazy bare metal restore process. At the point in time represented by system 400, data volumes 425 have been retrieved from the selected backup image on backup server computer system 110 and stored on storage device 225C of new client computer system 205C. New client computer system 205C and storage device 225C are intended to represent new client computer system 205B and storage device 225B (of FIG. 3) at a subsequent point in time of the lazy bare metal restore process.

Accordingly, now that data volumes 425 have been restored, system 400 may boot into the normal mode of operating system 435. In various embodiments, a "normal mode" represents an unrestricted mode in which applications and services are permitted to be executed. This may be the fully functional operating system which will match the operational state of previous client computer system 105 prior to a failure or other event. This may effectively complete the lazy bare metal restore process, with new client computer system 205C representing a complete restore of the OS and data volumes of the previous client computer system 105.

Figure 5:
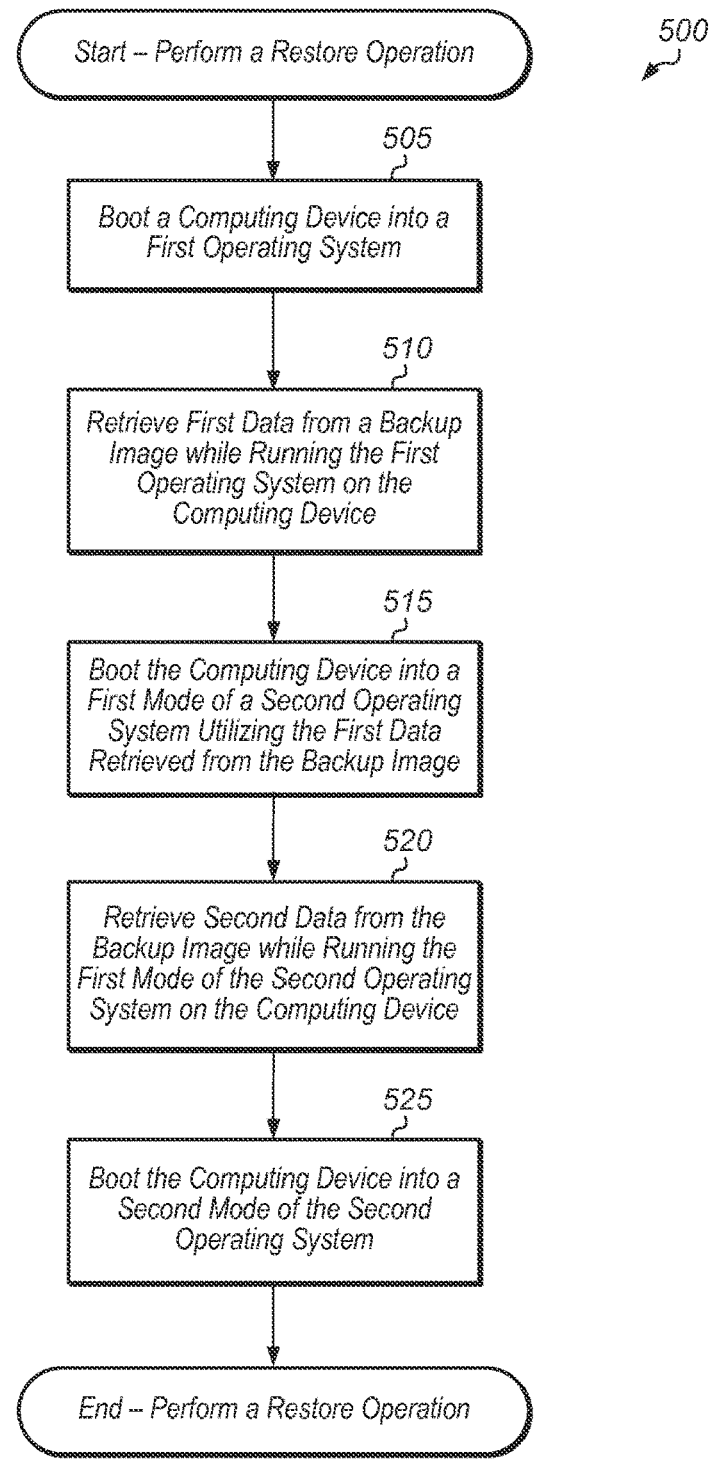
FIG. 5 is a generalized flow diagram illustrating one embodiment of a method for performing a restore operation.

Referring now to FIG. 5, one embodiment of a method 500 for performing a restore operation is shown. For purposes of discussion, the steps in this embodiment are shown in sequential order. It should be noted that in various embodiments of the method described below, one or more of the elements described may be performed concurrently, in a different order than shown, or may be omitted entirely. Other additional elements may also be performed as desired. Any of the various devices, apparatuses, or systems described herein may be configured to implement method 500.

A computing device may be booted into a first operating system (block 505). The computing device may be a bare metal computing device (i.e., without an operating system) prior to being booted with the first operating system. In one embodiment, the first OS may be a mini-OS such as WinPE. In other embodiment, the first OS may be any of various other types of OS's (e.g., Linux mini-OS). It is noted that the computing device may also be referred to as a computing system, computer system, server, handheld device, mobile device, client machine, or the like. Next, first data may be retrieved from a backup image while running the first operating system on the computing device (block 510). In one embodiment, the first data may be the OS volumes of the backup image of a client computing system.

Next, the computing device may be booted into a first mode of a second operating system on the computing device utilizing the first data retrieved from the backup image (block 515). It may be assumed for the purposes of this discussion that the second operating system is different from the first operating system. In various embodiments, the first mode of the second operating system may be a restricted mode which prevents applications associated with the second operating system from being started on bootup. In one embodiment, the second operating system may be a Windows operating system, and the first mode may be safe mode. In another embodiment, the second operating system may be a Linux operating system, and the first mode may be run level one.

Next, second data may be retrieved from the backup image while running the first mode of the second operating system on the computing device (block 520). It may be assumed for the purposes of this discussion that the second data is different from the first data. In one embodiment, the second data may include client configuration data (e.g., non-OS volumes) and may include one or more applications (e.g., volume manager) and application data from the backup image. Next, the computing device may be booted into a second mode of the second operating system (block 525). It may be assumed for the purposes of this discussion that the second mode is different from the first mode. In one embodiment, the second mode may be normal mode. After block 525, method 500 may end.

Figure 6:
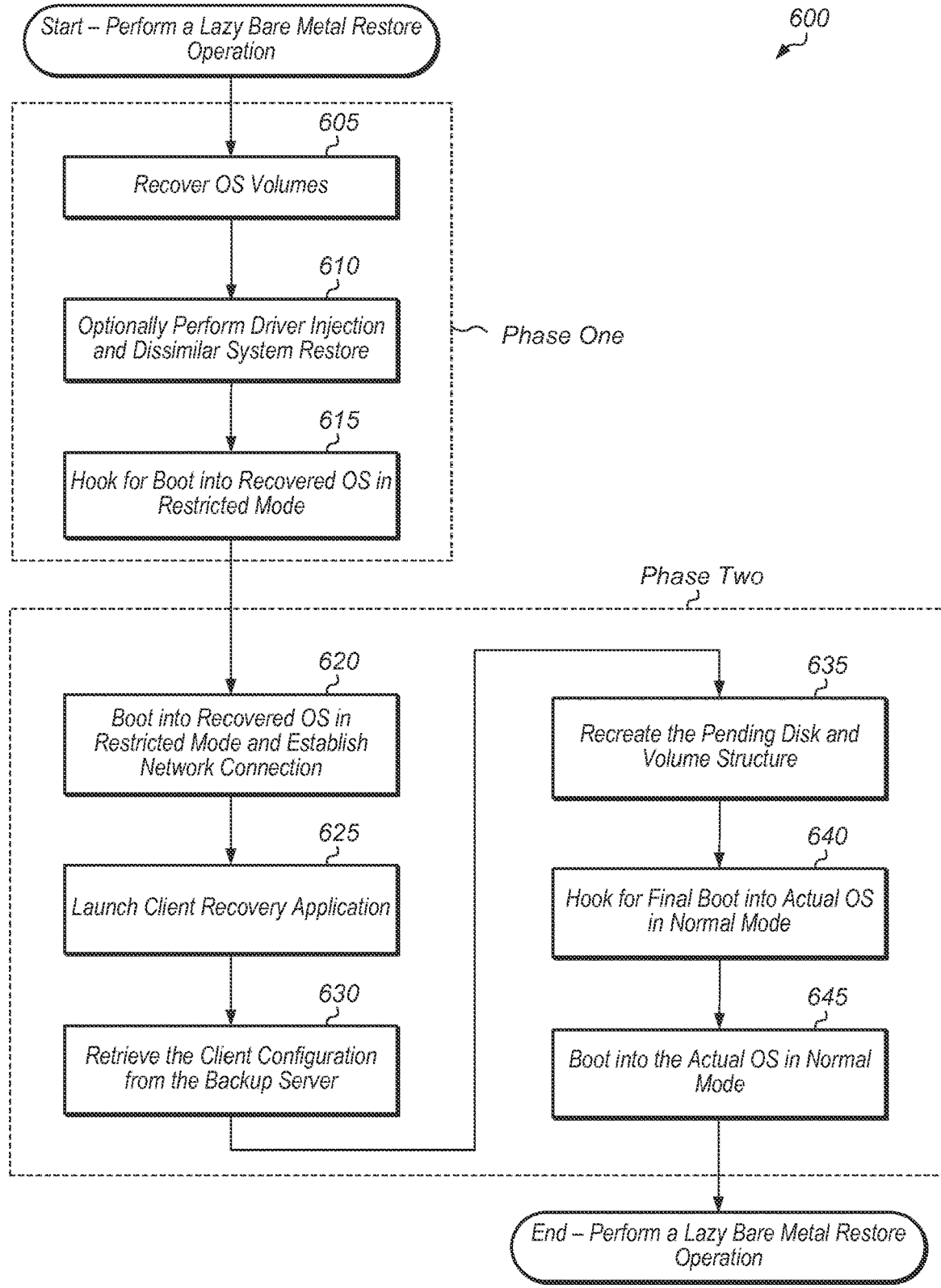
FIG. 6 is a generalized flow diagram illustrating one embodiment of a method for performing a lazy bare metal restore operation.

Turning now to FIG. 6, one embodiment of a method 600 for performing a lazy bare metal restore operation is shown. For purposes of discussion, the steps in this embodiment are shown in sequential order. It should be noted that in various embodiments of the method described below, one or more of the elements described may be performed concurrently, in a different order than shown, or may be omitted entirely. Other additional elements may also be performed as desired. Any of the various devices, apparatuses, or systems described herein may be configured to implement method 600.

A computing system may recover OS volumes (block 605). In one embodiment, the computing system may recover the OS volumes from a backup server. Alternatively, the computing system may recover the OS volumes from a locally connected source. In one embodiment, the computing system may boot into WinPE to recover the OS volumes in block 605. Next, the computing system may optionally perform driver injection and dissimilar system restore (block 610). For example, when restoring an image created for a hardware configuration that differs from that of the target hardware (a "dissimilar" hardware configuration), it may be necessary to identify missing drivers and "inject" them into the recovery data (or otherwise make them available) so that the restore/recovery may properly proceed. It is noted that block 610 is an optional step which is needed only in the case of restores to dissimilar hardware. Then, the computing system may boot into the recovered OS in a restricted mode (block 615). In various embodiments, a restricted mode may refer to a mode of operation (.e.g., Microsoft® Windows® "safe mode", Apple® Macintosh "safe boot", Unix® "single-user mode") that largely limits applications and/or services to those essential for operation and diagnostics. In one embodiment, the OS may be a Windows® OS, and restricted mode may be safe mode. Blocks 605-615 may constitute phase one of the lazy bare metal restore operation. After block 615, phase two of the lazy bare metal restore operation may begin.

Next, the computing system may boot into the recovered OS in a restricted mode and establish a network connection (block 620). In one embodiment, for a Windows® OS being booted into safe mode, the Windows registry value HKEY_LOCAL_MACHINE\SYSTEM\CurrentControlSet\Control\SafeBoot\Option\Opt ionValue may be set to boot into safe mode with networking. Then, the computing system may launch a client recovery application (block 625). In one embodiment, the client recovery application may be Netbackup® from Symantec® Corporation. The client recovery application may be configured to retrieve backup data from a backup server by communicating with a recovery application executing on the backup server. In one embodiment, a registry change may be implemented to load a driver in safe mode. For example, HKEY_LOCAL_MACHINE\SYSTEM\CurrentControlSet\Control\SafeBoot\Network\v olmgrx.sys @="Driver". For a service to be running in safe mode, the following registry change may be implemented: HKEY_LOCAL_MACHINE\SYSTEM\CurrentControlSet\Control\SafeBoot\Network\WinMgmt @="Service". Next, the computing system may retrieve the client configuration from the backup server (block 630).

Next, the computing system may recreate the pending disk and volume structure from the retrieved client configuration (block 635). The pending disk and volume structure may be recreated in accordance with the target volume manager software on the computing system. It is noted that blocks 625, 630, and 635 may be performed while the computing system is executing the recovered OS in restricted mode. Then, the computing system may hook for final boot into the actual OS in normal mode (block 640). Block 640 may entail deleting temporary files and performing cleanup operations in preparation for the final boot. Next, the computing system may boot into the actual OS in normal mode (block 645). It is noted that blocks 620-645 may constitute the second phase of the lazy bare metal restore operation. After block 645, method 600 may end.

Figure 7:
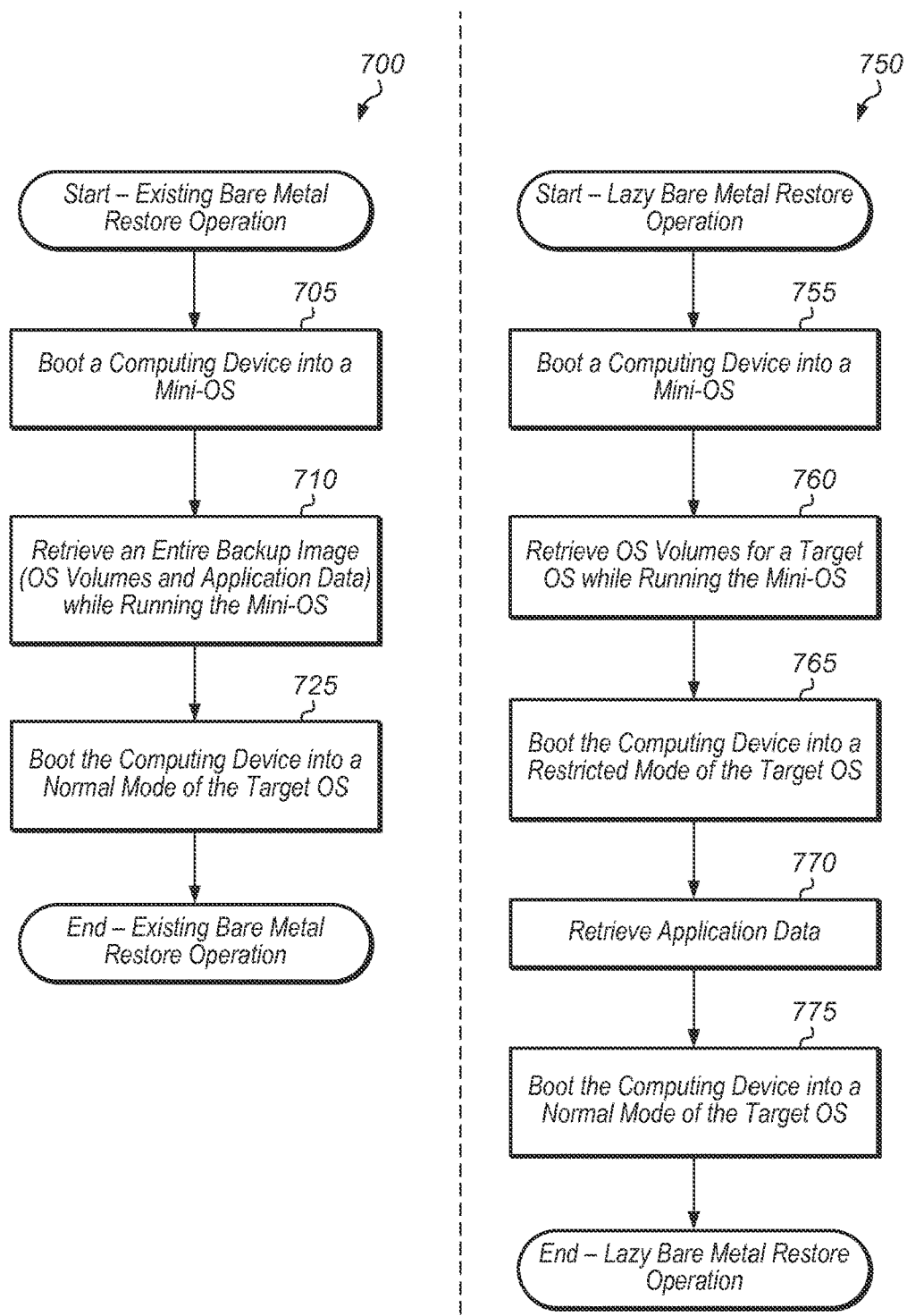
FIG. 7 illustrates a comparison between an existing bare metal restore approach and a new lazy bare metal restore approach.

Referring now to FIG. 7, a comparison between an existing bare metal restore approach and a new lazy bare metal restore approach is shown. The existing bare metal restore approach 700 is shown on the left-side of FIG. 7 with the new lazy bare metal restore approach 750 shown on the right-side of FIG. 7. The existing bare metal restore approach 700 begins with a computing device being booted into a mini-OS (block 705). Next, the entire backup image of OS volumes and application data may be retrieved while running the mini-OS (block 710). The challenge with block 710 is managing the compatibility of a specific version of the mini-OS with the target versions of applications (e.g., volume manager software, file system). In some cases, multiple versions of the mini-OS may need to be maintained to ensure compatibility with different applications on the target system. After block 710, the computing device may be booted into the normal mode of the target OS (block 715). After block 715, approach 700 may end.

The new lazy bare metal restore approach 750 is shown on the right-side of FIG. 7, and approach 750 begins with a computing device being booted into a mini-OS (block 755). Next, the computing device may retrieve the OS volumes for a target OS while running the mini-OS (block 760). Next, the computing device may be booted into a restricted mode of the target OS (block 765). The remaining volume-layout & file system(s) will get recreated using the volume manager software which was recovered as part of the target OS. Then, the computing device may retrieve application data associated with a selected backup image (block 770). Next, the computing device may boot into a normal mode of the target OS (block 775). After block 775, approach 750 may end.

In various embodiments, program instructions of a software application may be used to implement the methods and/or mechanisms previously described. The program instructions may describe the behavior of hardware in a high-level programming language, such as C. Alternatively, a hardware design language (HDL) may be used, such as Verilog. The program instructions may be stored on a non-transitory computer readable storage medium. Numerous types of storage media are available. The storage medium may be accessible by a computing system during use to provide the program instructions and accompanying data to the computing system for program execution. The computing system may include at least one or more memories and one or more processors configured to execute program instructions.

It should be emphasized that the above-described embodiments are only non-limiting examples of implementations. Numerous variations and modifications will become apparent to those skilled in the art once the above disclosure is fully appreciated. It is intended that the following claims be interpreted to embrace all such variations and modifications.

What is claimed is:

1. A method comprising:
   booting into a first operating system on a computing device;
   retrieving first data while running the first operating system on the computing device;
   booting into a restricted mode of a second operating system on the computing device utilizing the first data, wherein the second operating system is different from the first operating system, and wherein the restricted mode prevents applications associated with the second operating system from starting;
   executing a client recovery application on the computing device while running the restricted mode of the second operating system on the computing device, wherein the client recovery application executing on the computing device is configured to:
      communicate with a recovery application executing on a backup server; and
      retrieve second data, to store on the computing device, from a backup image on the backup server, wherein:
         the second data is different from the first data; and
         the backup image is a data set that includes a copy of at least some data in a data source previously stored on the computing device from which the data set is created.

2. The method as recited in claim 1, further comprising booting into a normal mode of the second operating system on the computing device responsive to recreating a pending disk and volume structure from the retrieved second data stored on the computing device while running the restricted mode of the second operating system, wherein the normal mode is an unrestricted mode in which applications and services are permitted to be executed.

3. The method as recited in claim 1, wherein the second data comprises one or more non-operating system volumes and a volume manager layout.

4. The method as recited in claim 1, wherein the second data includes application data and a volume manager.

5. The method as recited in claim 1, wherein to execute the client recovery application and load any necessary drivers while running the restricted mode of the second operating system, the method further comprises performing a registry change in the second operating system.

6. The method as recited in claim 1, wherein the second data comprises client configuration data.

7. The method as recited in claim 1, further comprising preventing the second data from being retrieved from the backup image while running the first operating system on the computing device.

8. A system comprising:
   a memory; and
   one or more processors coupled to the memory;
   wherein the system is configured to:
      boot into a first operating system;
      retrieve first data while running the first operating system;
      boot into a restricted mode of a second operating system utilizing the first data, wherein the second operating system is different from the first operating system, and wherein the restricted mode prevents applications associated with the second operating system from starting;
      execute a client recovery application on the computing device while running the restricted mode of the second operating system on the computing device, wherein the client recovery application executing on the computing device is configured to:
         communicate with a recovery application executing on a backup server; and
         retrieve second data, to store on the computing device, from a backup image on the backup server, wherein:
            the second data is different from the first data; and
            the backup image is a data set that includes a copy of at least some data in a data source previously stored on the computing device from which the data set is created.

9. The system as recited in claim 8, wherein the system is further configured to boot into a normal mode of the second operating system responsive to recreating a pending disk and volume structure from the retrieved second data stored on the computing device while running the restricted mode of the second operating system, wherein the normal mode is different from an unrestricted mode in which applications and services are permitted to be executed.

10. The system as recited in claim 8, wherein the second data comprises one or more non-operating system volumes and a volume manager layout.

11. The system as recited in claim 8, wherein the second data includes application data and a volume manager.

12. The system as recited in claim 8, wherein to execute the client recovery application and load any necessary drivers while running the restricted mode of the second operating system, the system is further configured to perform a registry change in the second operating system.

13. The system as recited in claim 8, wherein the second data comprises client configuration data.

14. The system as recited in claim 8, wherein the system is further configured to preventing the second data from being retrieved from the backup image while running the first operating system on the computing device.

15. A non-transitory computer readable storage medium storing program instructions, wherein the program instructions are executable by a processor to:
   boot into a first operating system;
   retrieve first data while running the first operating system;
   boot into a restricted mode of a second operating system utilizing the first data, wherein the second operating system is different from the first operating system, and wherein the restricted mode prevents applications associated with the second operating system from starting;

execute a client recovery application on the computing device while running the restricted mode of the second operating system on the computing device, wherein the client recovery application executing on the computing device is configured to:

communicate with a recovery application executing on a backup server; and retrieve second data, to store on the computing device, from a backup image on the backup server wherein: the second data is different from the first data; and the backup image is a data set that includes a copy of at least some data in a data source previously stored on the computing device from which the data set is created.

16. The non-transitory computer readable storage medium as recited in claim 15, wherein the program instructions are further executable by a processor to boot into a normal mode of the second operating system responsive to recreating a pending disk and volume structure from the retrieved second data stored on the computing device while running the restricted mode of the second operating system, wherein the normal mode is different from an unrestricted mode in which applications and services are permitted to be executed.

17. The non-transitory computer readable storage medium as recited in claim 15, wherein the second data comprises one or more non-operating system volumes and a volume manager layout.

18. The non-transitory computer readable storage medium as recited in claim 15, wherein the second data includes application data and a volume manager.

19. The non-transitory computer readable storage medium as recited in claim 15, wherein to execute the client recovery application and load any necessary drivers while running the restricted mode of the second operating system, the program instructions are further executable by a processor to perform a registry change in the second operating system.

20. The non-transitory computer readable storage medium as recited in claim 15, wherein the second data comprises client configuration data.

* * * * *